(12) United States Patent
Gupta et al.

(10) Patent No.: US 9,378,510 B2
(45) Date of Patent: Jun. 28, 2016

(54) AUTOMATIC DETERMINATION OF ACCOUNT OWNERS TO BE ENCOURAGED TO UTILIZE POINT OF SALE TRANSACTIONS

(71) Applicant: MasterCard International Incorporated, Purchase, NY (US)

(72) Inventors: Amit Gupta, New Delhi (IN); Suyash Awasthi, Kanpur (IN)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 14/482,219

(22) Filed: Sep. 10, 2014

(65) Prior Publication Data

US 2016/0071133 A1   Mar. 10, 2016

(51) Int. Cl.
*G06Q 20/40* (2012.01)
*G06Q 30/02* (2012.01)
*G06Q 40/00* (2012.01)
*G06Q 20/10* (2012.01)
*G06Q 20/20* (2012.01)

(52) U.S. Cl.
CPC ........ *G06Q 30/0204* (2013.01); *G06Q 20/1085* (2013.01); *G06Q 20/20* (2013.01); *G06Q 30/0201* (2013.01); *G06Q 40/00* (2013.01)

(58) Field of Classification Search
CPC .......... G06Q 30/0201; G06Q 30/0202; G06Q 30/0241; G06Q 30/0247; G06Q 30/0251
USPC .............................. 235/380; 705/14.45, 14.23
See application file for complete search history.

(56) References Cited

U.S. PATENT DOCUMENTS

| 6,925,441 | B1 * | 8/2005 | Jones, III | G06Q 10/06375 705/14.1 |
| 2014/0006129 | A1 * | 1/2014 | Heath | G06Q 30/0222 705/14.23 |
| 2015/0019326 | A1 * | 1/2015 | Russell | G06Q 30/02 705/14.45 |
| 2015/0058134 | A1 * | 2/2015 | Hwang | G06Q 20/34 705/14.66 |
| 2015/0287068 | A1 * | 10/2015 | Porco | G06Q 30/0227 705/14.28 |

* cited by examiner

*Primary Examiner* — Allyson Trail
(74) *Attorney, Agent, or Firm* — Buckley, Maschoff & Talwalkar LLC

(57) ABSTRACT

According to some embodiments, account owner information associated with account owners of payment accounts (e.g., credit card accounts) may be retrieved from an account owner database. The retrieved account owner information may be analyzed to automatically identify a set of account owners primarily associated with automated teller machine device transactions in connection with the payment accounts. From the set of account owners primarily associated with automated teller machine device transactions, a sub-set of account owners to be encouraged to utilize point of sale transactions in connection with the payment accounts may be automatically created. Moreover, a potential transaction spend value associated with the sub-set of account owners may be calculated and output.

22 Claims, 11 Drawing Sheets

400

| ACCOUNT AND TRANSACTION IDENTIFIERS 402 | MERCHANT IDENTIFIER 404 | DATE AND TIME 406 | AMOUNT 408 | DESCRIPTION 410 |
|---|---|---|---|---|
| A_1001 T_12131 | M_101 | 07/04/2015 08:38 | $25.25 | POS - BOOKSTORE |
| A_1001 T_26772 | M_439 | 07/10/2015 14:33 | $100.00 | ATM TRANSACTION |
| A_1001 T_37863 | M_101 | 07/15/2015 06:12 | $34.23 | POS - BOOKSTORE |
| A_1001 T_48756 | M_832 | 07/20/2015 11:54 | $40.00 | ATM TRANSACTION |

FIG. 4

| ACCOUNT OWNER IDENTIFIER 502 | GENDER AND AGE 504 | LOCATION 506 |
|---|---|---|
| A_101 | FEMALE 25 | 123 MAIN STREET, SMITHTOWN NY |
| A_102 | MALE 72 | ZIP CODE 06840 |
| A_103 | FEMALE 37 | NOT APPLICABLE |
| A_104 | FEMALE 27 | LAT: N 35 05 LONG: W 106 39 |

FIG. 5

| ACCOUNT IDENTIFIER 602 | CONFIDENCE LEVEL 604 | POTENTIAL TRANSACTION SPEND VALUE 606 |
|---|---|---|
| A_1001 | 85% | $2,500.00 PER YEAR |
| A_1002 | 20% | $10,000.00 PER YEAR |
| A_1003 | 90% | $750.00 PER YEAR |
| A_1004 | 15% | $500.00 PER YEAR |

AUTOMATIC DETERMINATION OF ACCOUNT OWNERS TO BE ENCOURAGED TO UTILIZE POINT OF SALE TRANSACTIONS

BACKGROUND

People use payment accounts to facilitate transactions. For example, in some cases an account owner may insert a payment card (e.g., a credit card or debit card) into an Automated Teller Machine ("ATM"), enter his or her Personal Identification Number ("PIN"), and receive cash that he or she can then use to purchase items or services. In other cases, an account owner may present his or her payment card at a Point Of Sale ("POS") device (e.g., at a merchant's cash register) to purchase items or services.

Note that while using a payment card at a POS device may be more convenient for an account owner, some people may not be in the habit of doing so. In addition to the improved convenience for the account owner, other parties may benefit from increased use of POS transactions as compared to ATMs. For example, a payment account issuer might receive increased revenue as account owners migrate from ATM usage to POS transactions. Attempting to manually encourage account owners to utilize POS transactions, such as by implementing a general marketing campaign, can be an expensive, time-consuming, and error prone task. This can be especially true when a substantial number of people from many different countries are involved. As a result, systems and methods to automatically help facilitate a migration from ATM usage to POS transactions may be desired.

BRIEF DESCRIPTION OF THE DRAWINGS

FIG. 4 is a tabular portion of an account owner and transaction database according to some embodiments.

FIG. 5 is a tabular portion of a set of ATM users database in accordance with some embodiments.

DETAILED DESCRIPTION

In some cases an account owner may insert a payment card (e.g., a credit card or debit card) into an ATM, enter his or her PIN, and receive cash that he or she can then use to purchase items or services. In other cases, an account owner may present his or her payment card at a POS device to purchase items or services. Note that while using a payment card at a POS device may be more convenient for an account owner, some people may not be in the habit of doing so. Attempting to manually encourage account owners to utilize POS transactions, such as by implementing a general marketing campaign, can be an expensive, time-consuming, and error prone task, especially when a substantial number of people are involved. It would therefore be desirable to provide accurate and efficient systems and methods to automatically help facilitate a migration from ATM usage to POS transactions.

Figure 1:
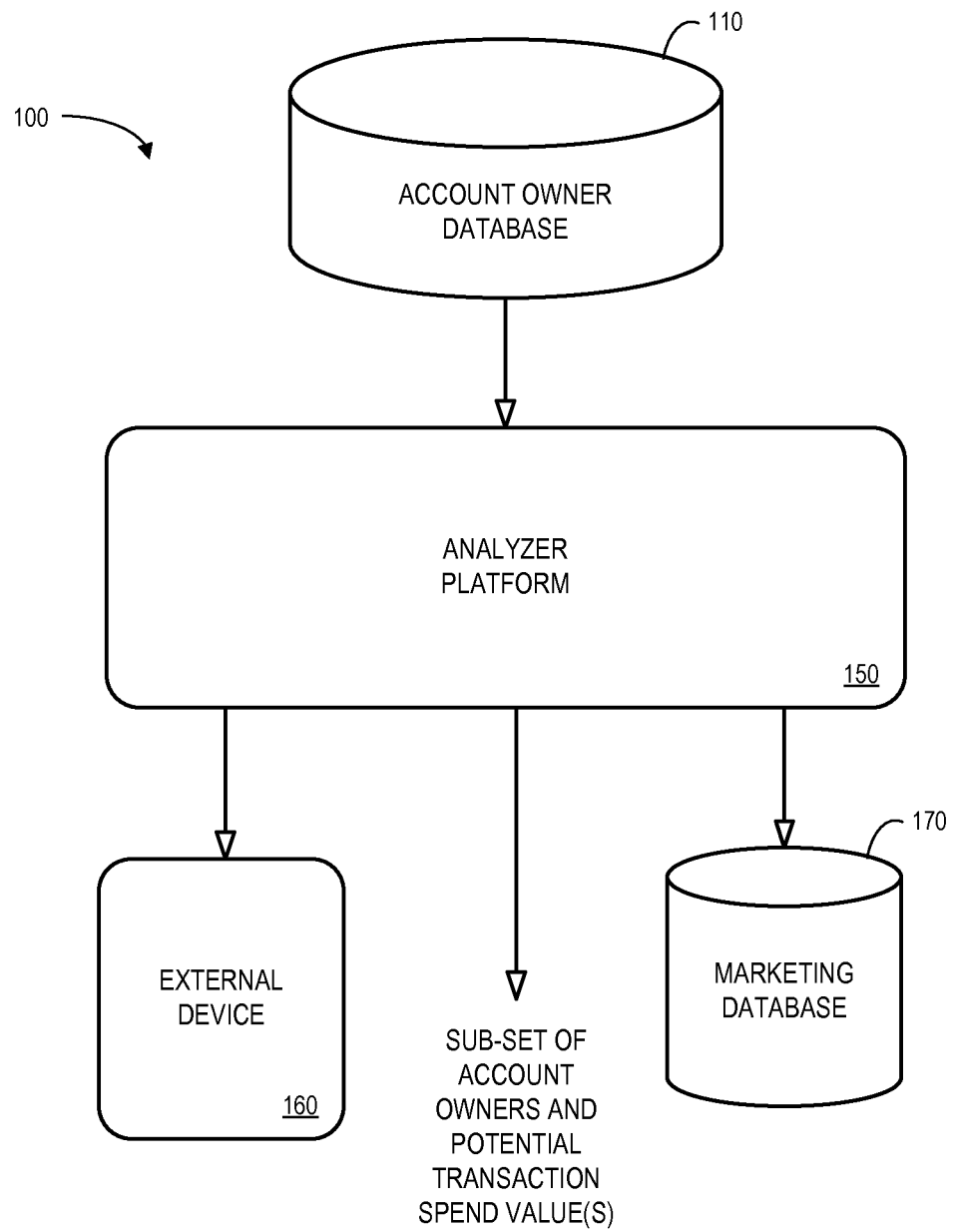
FIG. 1 is a block diagram overview of a system according to some embodiments of the present invention.

FIG. 1 is block diagram of a system 100 according to some embodiments of the present invention. In particular, the system 100 includes an analyzer platform 150 that receives information from an account owner database 110 and outputs information associated with ATM-to-POS migration, such as by outputting information to an external device 160 and/or a marketing database 170 (e.g., a database to be used to launch a targeted advertising, promotional, and/or marketing campaign).

The analyzer platform 150 might be, for example, associated with a Personal Computer (PC), laptop computer, an enterprise server, a server farm, and/or a database or similar storage devices. The analyzer platform 150 may, according to some embodiments, be associated with a credit card company.

According to some embodiments, an "automated" analyzer platform 150 may facilitate the determination of a sub-set of account owners and/or potential transaction spend values. For example, the analyzer platform 150 may automatically output a list of account owners who currently primarily use ATMs but who make be relatively easily convinced to migrate to POS transactions. As used herein, the term "automated" may refer to, for example, actions that can be performed with little (or no) intervention by a human.

As used herein, devices, including those associated with the analyzer platform 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The analyzer platform 150 may retrieve account owner information from the account owner database 110. The account owner database 110 might be associated with, for example, payment accounts, such as credit card or bank accounts. The account owner database 110 may be locally stored or reside remote from the analyzer platform 150. As will be described further below, the account owner database 110 may be used by the analyzer platform 150 to generate a sub-set of account owners and potential transaction spend values. According to some embodiments, the analyzer platform 150 communicates information to an external device 160, such as by transmitting an electronic file to an email server, a workflow management system, etc. In other embodiments, the analyzer platform 150 might store ATM-to-POS migration information in the marketing database 170.

Although a single analyzer platform 150 is shown in FIG. 1, any number of such devices may be included. Moreover, various devices described herein might be combined according to embodiments of the present invention. For example, in some embodiments, the analyzer platform 150 and account owner database 110 might be co-located and/or may comprise a single apparatus.

In accordance with some embodiments, the systems and methods described herein provide a framework to identify people who may be open to the idea of switching from ATM usage to POS transactions based on account owner information associated with payment accounts. The account owner might be associated with, for example, demographic information and/or historical payment transaction information. For example, a payment card may presented by a cardholder (e.g., the account owner) to make a payment. By way of example, and without limiting the generality of the foregoing, a payment card can be a credit card, debit card, charge card, stored-value card, or prepaid card or nearly any other type of financial transaction card. Further, as used herein in, the term "issuer" or "attribute provider" can include, for example, a financial institution (i.e., bank) issuing a card, a merchant issuing a merchant specific card, a stand-in processor configured to act on-behalf of the card-issuer, or any other suitable institution configured to issue a payment card. As used herein, the term "transaction" can be associated with, for example, a merchant, a merchant terminal, an ATM, or any other suitable institution or device configured to initiate a financial transaction per the request of the account owner.

The information in the account owner database 110 may be associated with, for example, a "payment card processing system" or "credit card processing networks," such as the MasterCard® network that allows account owners to use payment cards issued by a variety of issuers to shop at a variety of merchants. With this type of payment card, a card issuer or attribute provider, such as a bank, extends credit to an account owner to purchase products or services. When an account owner makes a purchase from an approved merchant or withdraws funds via an ATM, the card number and amount of the purchase, along with other relevant information, are transmitted via the processing network to a processing center, which verifies that the card has not been reported lost or stolen and that the card's credit limit has not been exceeded. In some cases, the account owner's signature is also verified, a personal identification number is required or other user authentication mechanisms are imposed. The account owner is required to repay the bank for the purchases or cash withdrawals, generally on a monthly basis.

The account owner database 110 may further store a "business classification," which is a group of merchants and/or businesses, by the type of goods and/or service the merchant and/or business provides. For example, the group of merchants and/or businesses can include merchants and/or business, which provide similar goods and/or services. In addition, the merchants and/or businesses can be classified based on geographical location, sales, and any other type of classification, which can be used to associate a merchant and/or business with similar goods, services, locations, economic and/or business sector, industry and/or industry group.

The account owner database 110 may also store a "merchant category code" or "MCC," which is a four-digit number created by MasterCard® or VISA® and assigned to a business by the acquirer when the business first starts accepting one of these cards as a form of payment. The MCC is used to classify the business by the type of goods or services it provides. For example, in the United States, the merchant category code can be used to determine if a payment needs to be reported to the IRS for tax purposes. In addition, Merchant Category Codes (or "MCCs") are used by card issuers to categorize, track or restrict certain types of purchases.

In accordance with some embodiments, data associated with payment card transactions is stored within the account owner database 110. The data may include, for example, a listing of sales amount for each payment card transaction including the type of goods and/or services sold, a total number of goods and/or services sold in each transaction, a total sales amount for each transaction (e.g., gross dollar amount). In addition, for each merchant and/or business, the data associated with each transaction may include a point-of-sale or point-of-purchase (e.g., location of each payment card transaction). The point-of-sale or point-of-purchase provides that for merchants and/or businesses having one or more locations, the location of the merchant and/or business, which generated the sale can be identified.

Figure 2:
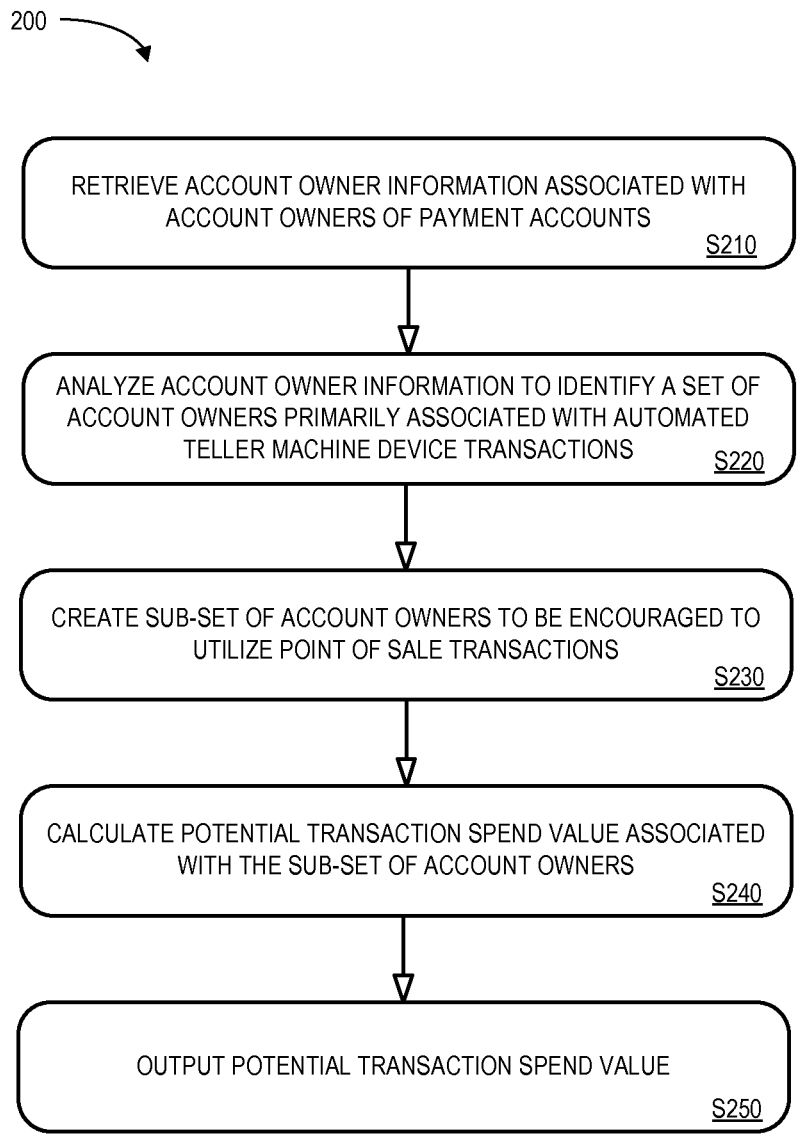
FIG. 2 illustrates a method that might be performed in accordance with some embodiments.

FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, account owner information associated with account owners of payment accounts may be retrieved. The payment accounts might be associated with, for example, credit card accounts, debit card accounts, bank accounts, and/or pre-paid card accounts. The account owner information might include demographic information, such as ages, genders, location information, income information, education information, marital status, occupation, etc.

The account owner information retrieved at S210 might include transaction information representing payments made via the payment accounts, such as account identifiers, merchant identifiers, dates, times of day, payment amounts, payment descriptions (e.g., indicating if the transaction is associated with an ATM or POS device), location information, and/or transaction frequencies.

At S220, the retrieved account owner information may be analyzed to automatically identify a set of account owners "primarily" associated with ATM device transactions in connection with the payment accounts. By way of example, the account owners might be included in the set if they only use ATM transactions, use ATM transactions more than 30 percent of the time, use ATM transactions at least twice a week, etc. According to some embodiments, the set of account owners primarily associated with ATM device transactions is identified on a portfolio-by-portfolio basis (e.g., it might be noted that Internet banking customers behave differently as compared to traditional banking customers).

From the set of account owners primarily associated with ATM device transactions, at S230 a sub-set of account owners to be encouraged to utilize POS transactions in connection with the payment accounts may be automatically created. For example, it might be determined that of all account holders who only currently use ATM transactions, females under the age of 40 years old may be the most likely to migrate to POS transactions. In this way, a marketing campaign targeting females under the age of 40 may be executed to facilitate such migration. According to some embodiments, the sub-set of account owners to be encouraged to utilize point of sale transactions is created based at least in part on account owner profiling and/or statistical models (e.g., similar account owners who have migrated from ATM usage to POS transactions in the past may be identified).

At S240, a potential transaction spend value associated with the sub-set of account owners may be automatically calculated. The potential transaction spend value might represent an amount for the entire sub-set or may be calculated on an owner-by-owner basis. At S250, the automatically calculated potential transaction spend value (or values) may be output (e.g., to be used to tailor an appropriate marketing campaign). For example, a group of account owners likely to spend a substantial amount of money via POS transactions may be targeted as compared to another group that is likely to spend less.

Figure 3:
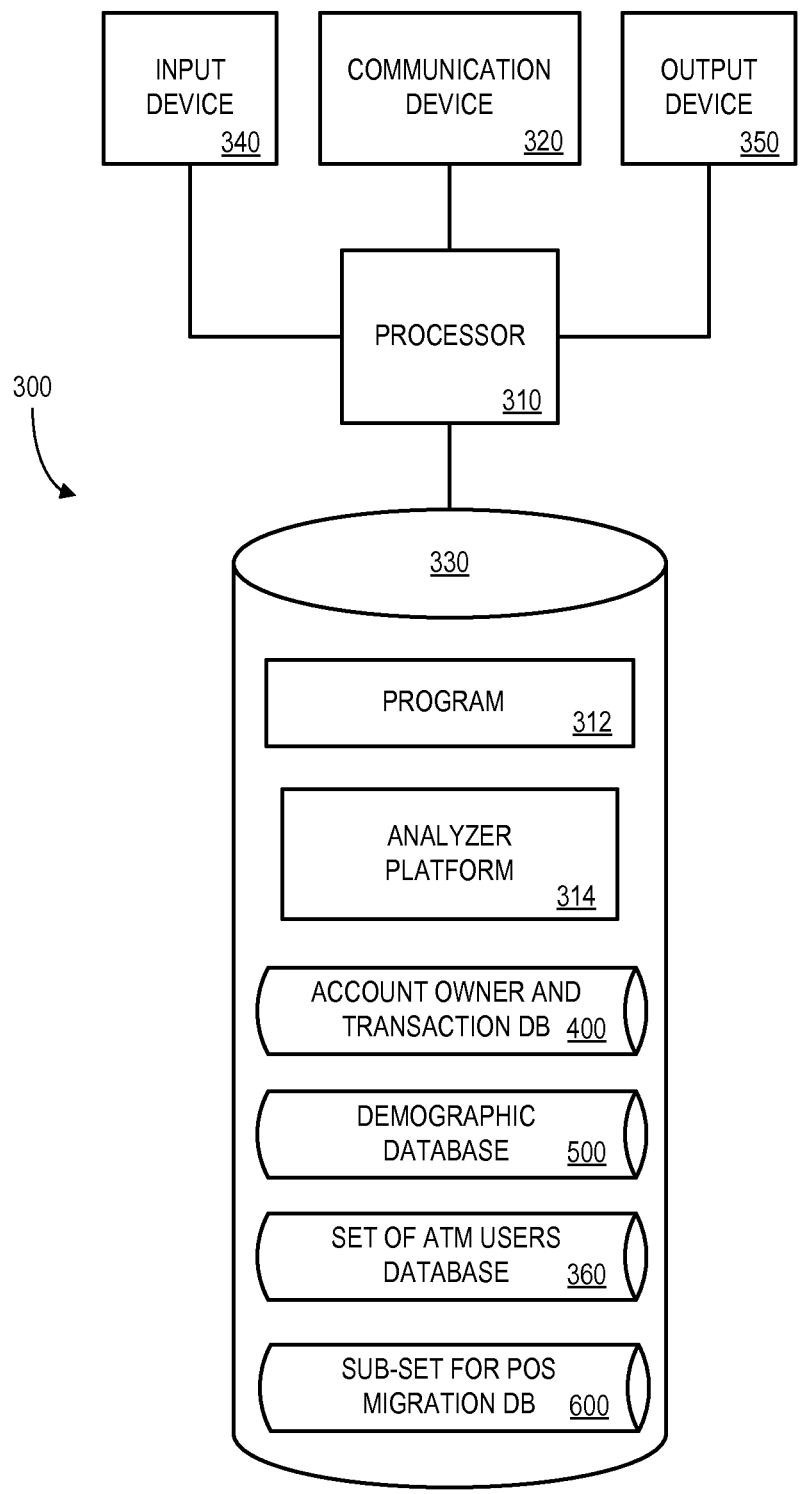
FIG. 3 is block diagram of an analyzer tool or platform according to some embodiments of the present invention.

In this way, account owner information may be analyzed to automatically facilitate migration from ATM usage to POS transactions. Note that the embodiments described herein may be implemented using any number of different hardware configurations. For example, FIG. 3 illustrates an analyzer platform 300 that may be, for example, associated with the system 100 of FIG. 1. The analyzer platform 300 comprises a processor 310, such as one or more commercially available Central Processing Units (CPUs) in the form of one-chip microprocessors, coupled to a communication device 320 configured to communicate via a communication network (not shown in FIG. 3). The communication device 320 may be used to communicate, for example, with one or more account owner databases. The analyzer platform 300 further includes an input device 340 (e.g., a computer mouse and/or keyboard to enter information about account owners or statistical models) and an output device 350 (e.g., a computer monitor or printer to output an account holder activity report).

The processor 310 also communicates with a storage device 330. The storage device 330 may comprise any appropriate information storage device, including combinations of magnetic storage devices (e.g., a hard disk drive), optical storage devices, mobile telephones, and/or semiconductor memory devices. The storage device 330 stores a program 312 and/or analyzer platform logic 314 for controlling the processor 310. The processor 310 performs instructions of the programs 312, 314, and thereby operates in accordance with any of the embodiments described herein. For example, the processor 310 may retrieve account owner information associated with account owners of payment accounts. The processor 310 may then analyze the retrieved account owner information to automatically identify a set of account owners primarily associated with ATM device transactions in connection with the payment accounts. The processor 310 may also, from the set of account owners primarily associated with ATM device transactions, automatically create a sub-set of account owners to be encouraged to utilize point of sale transactions in connection with the payment accounts. According to some embodiments, the processor 310 may also calculate one or more potential transaction spend values associated with the sub-set of account owners and/or output information to an external device.

The programs 312, 314 may be stored in a compressed, uncompiled and/or encrypted format. The programs 312, 314 may furthermore include other program elements, such as an operating system, a database management system, and/or device drivers used by the processor 310 to interface with peripheral devices.

As used herein, information may be "received" by or "transmitted" to, for example: (i) the analyzer platform 300 from another device; or (ii) a software application or module within the analyzer platform 300 from another software application, module, or any other source.

In some embodiments (such as shown in FIG. 3), the storage device 330 further stores an account owner and transaction database 400, a demographic database 500, a set of ATM users database 360, and a sub-set for POS migration database 600. Some examples of databases that may be used in connection with the analyzer platform 300 will now be described in detail with respect to FIGS. 4 through 6. Note that the databases described herein are only examples, and additional and/or different information may actually be stored therein. Moreover, various databases might be split or combined in accordance with any of the embodiments described herein. For example, the set of ATM users database 360 and sub-set for POS migration database 600 might be combined and/or linked to each other within the analyzer platform 300.

Referring to FIG. 4, a table is shown that represents the account owner and transaction database 400 that may be stored at the analyzer platform 300 according to some embodiments. The table may include, for example, entries identifying account owners and/or transactions that have been processed via a payment account (e.g., credit card transactions). The table may also define fields 402, 404, 406, 408, 410 for each of the entries. The fields 402, 404, 406, 408, 410 may, according to some embodiments, specify: account and transaction identifiers 402, a merchant identifier 404, a date and time 406, an amount 408, and a description 410. The account owner and transaction database 400 may be created and updated, for example, based on information electrically received on a periodic basis.

The account identifier 402 may be, for example, a unique alphanumeric code identifying a payment account, such as a Primary Account Number ("PAN"). The transaction identifier 402 may be associated with a particular transaction (e.g., a purchase at a gas station or a cash withdrawal from an ATM). The date and time 406 may indicate when the transaction occurred, and the amount 408 may indicate the monetary amount of the transaction. The description may indicate what was purchased in the transaction (e.g., a general indication that a credit card was used at an ATM or a restaurant, a type of goods or services typically offered by the merchant, etc.).

Referring to FIG. 5, a table is shown that represents the demographic database 500 that may be stored at the analyzer platform 300 according to some embodiments. The table may include, for example, entries identifying account owners. The table may also define fields 502, 504, 506 for each of the entries. The fields 502, 504, 506 may, according to some embodiments, specify: an account owner identifier 502, gender and age information 504, and a location 506. The demographic database 500 may be created and updated, for example, based on information electrically received on a periodic basis from a third party service.

The account owner identifier 502 may be, for example, a unique alphanumeric code identifying an account owner and may, or may not, be associated with the account owner identifier 404 in the account owner and transaction database 400. The gender and age information 504 may be associated with, for example, the account owners gender and/or age. The location 506 may, for example, comprise an address, a ZIP code, a latitude and longitude, or any other information associated with the account owner's geographic location.

Figure 6:
FIG. 6 is a tabular portion of a sub-set for POS migration database according to some embodiments.

Referring to FIG. 6, a table is shown that represents the sub-set for POS migration database 600 that may be stored at the analyzer platform 300 according to some embodiments. The table may include, for example, entries identifying account owners who may be relatively likely to switch from ATM usage to POS transactions. The table may also define fields 602, 604, 606 for each of the entries. The fields 602, 604, 606 may, according to some embodiments, specify: an account identifier 602, a confidence level, and a potential transaction spend value 606. The sub-set for POS migration database 600 may be created and updated, for example, automatically by an analyzer platform based on account owner and/or transaction data.

The account identifier 602 may be, for example, a unique alphanumeric code identifying a payment account and may, or may not, be associated with the account identifier 402 in the account owner and transaction database 400. The confidence level 604 may, for example, indicate how likely the account owner is to switch from ATM usage to POS transactions. The potential transaction spend value 606 may be a predicted estimate of the amount of money that will be associated with the account owner's eventual migration from ATM usage to POS transactions.

Figure 7:
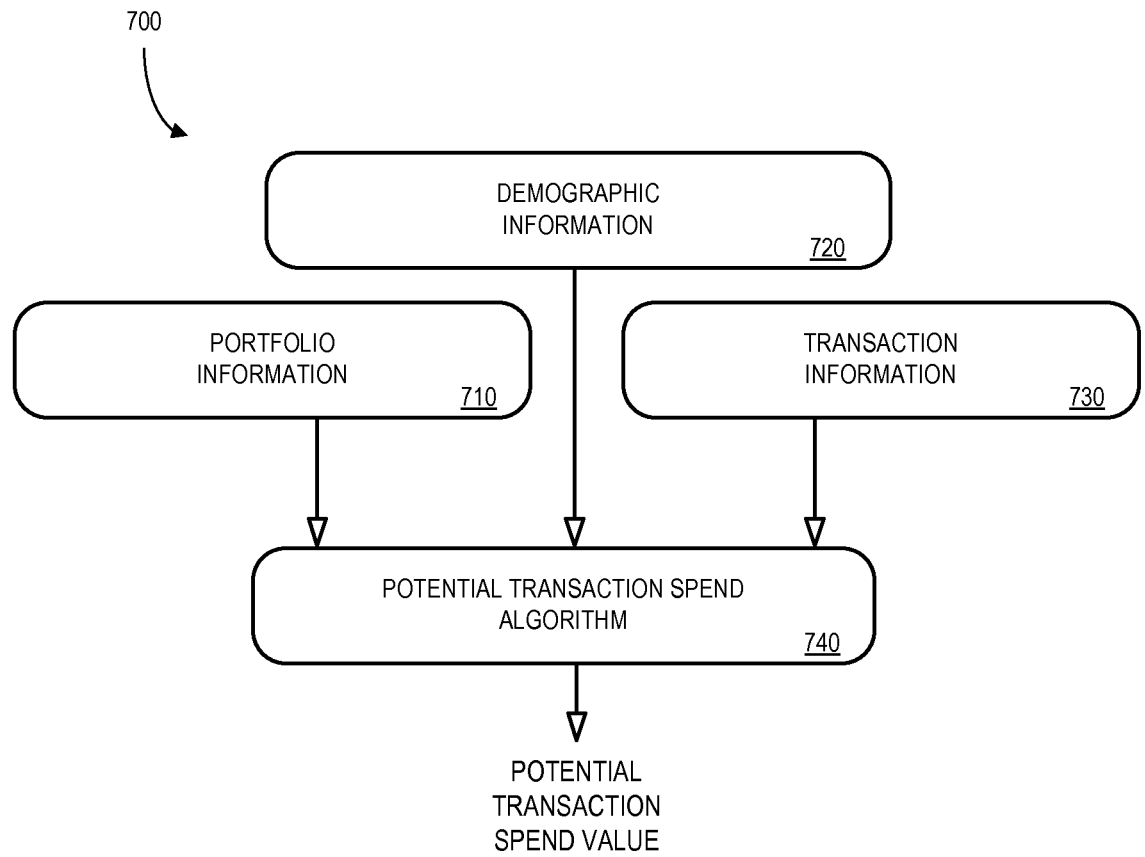
FIG. 7 illustrates a high-level information flow in accordance with some embodiments.

FIG. 7 illustrates a high-level information flow 700 in accordance with some embodiments. In particular, payment account portfolio information 710 may be provided to a potential transaction spend algorithm 740. The portfolio information 710 might include an indication as to whether the account owner is business or retail customer, an account and/or product type (e.g., a gold card or a silver card), how long the account holder was associated with a bank, whether or not the account is associated with Internet banking, etc. The potential transaction spend algorithm 740 may also receive demographic information 720, such as the account owner's age, gender, hometown, salary, etc. along with transaction information 730. The transaction information might include, for example, an amount of spending, transaction frequency, dates and/or times of day, ATM, POS, and electronic commerce data, and domestic/international indications. The potential transaction spend algorithm 740 may then use all of the received information to predict potential transaction spend value (or values) for the account owners.

Figure 8:
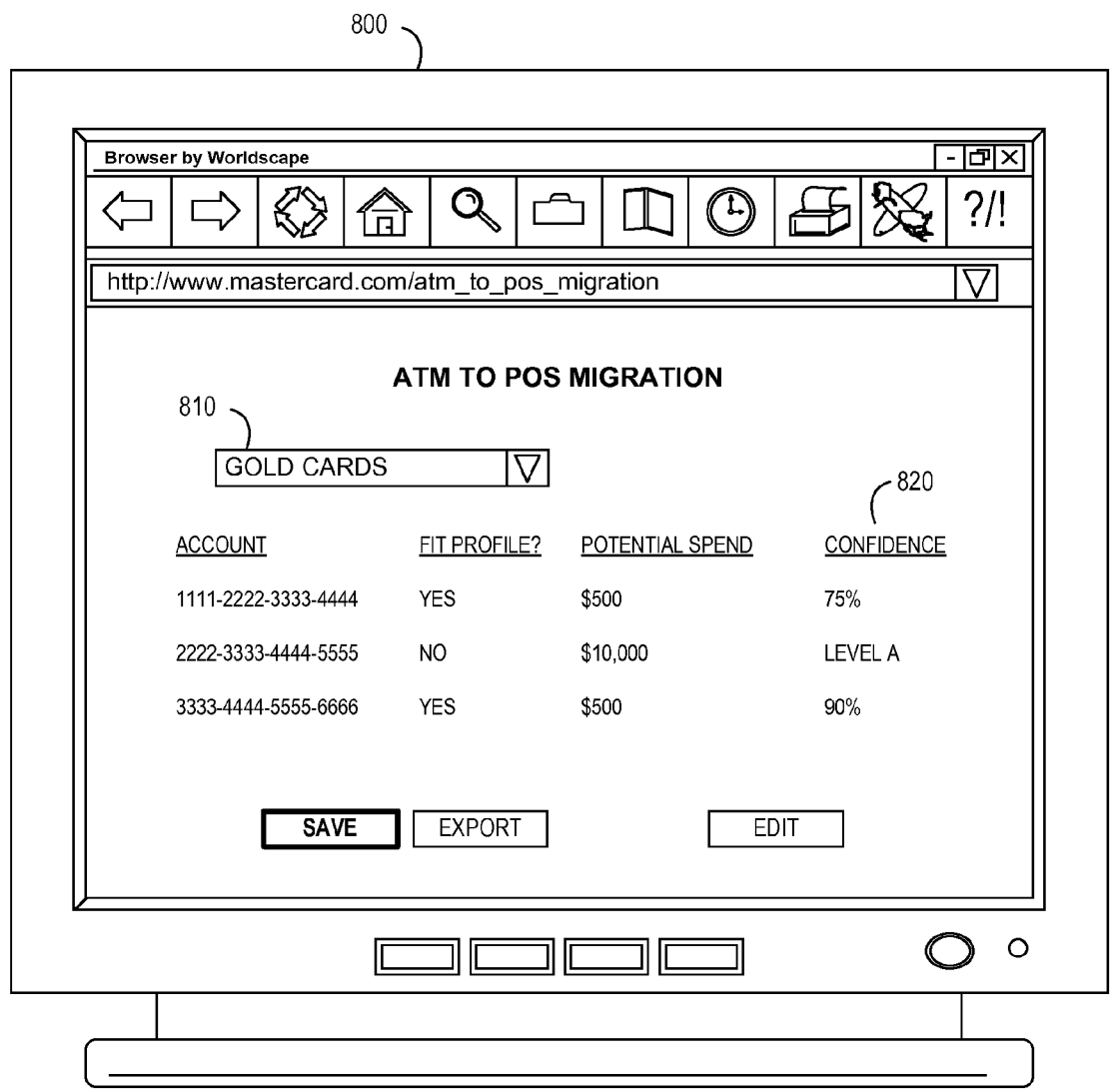
FIG. 8 is an example of a display that might be provided in accordance with some embodiments.

FIG. 8 is an example of a display 800 that might be provided in accordance with some embodiments. In particular, a user might select 810 which type or types of account owners should be included on the display (e.g., all payment account owners who are residents of California, all account owners who are under 35 years old, etc.). Moreover, as illustrated in FIG. 8, an analyzer platform may generate and display an indication as to whether or not the account owner fits a customer profile (and, as a result, is likely to migrate from ATM usage to POS transactions) along with a potential spend value and a "confidence level" 820 associated with the account information. The confidence level 820 might indicate, for example, how likely it is that estimated or predicted spend value is actually correct (e.g., by a percentage likelihood or a confidence category).

Figure 9:
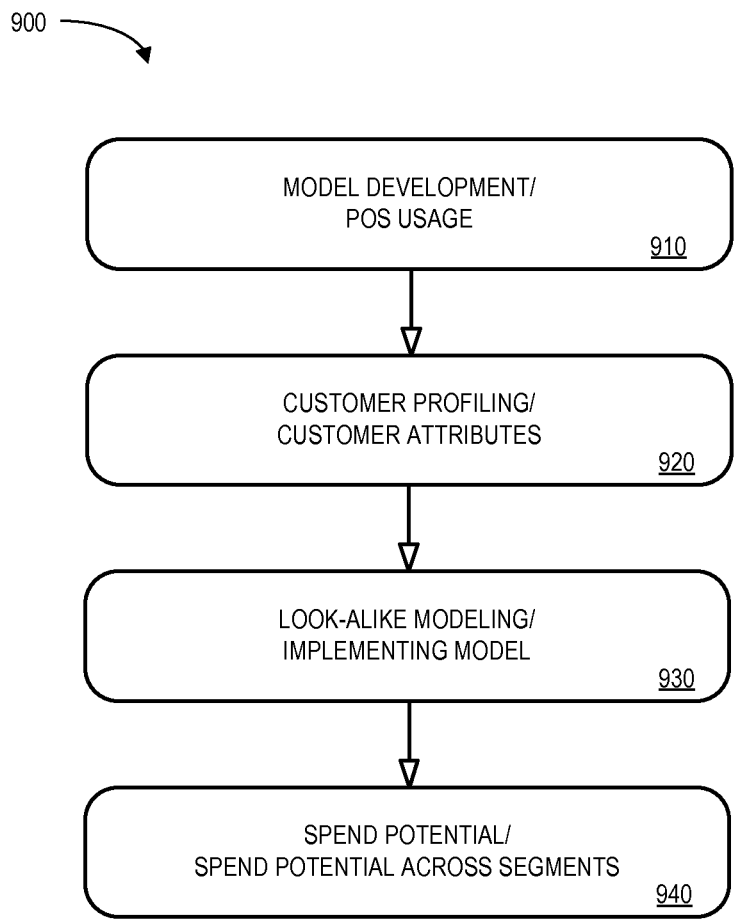
FIG. 9 illustrates a POS migration framework that might be implemented in accordance with some embodiments.

FIG. 9 illustrates a POS migration framework 900 that might be implemented in accordance with some embodiments. During an initial model development phase 910, POS usage may be analyzed to optimize a number of POS transaction, a decision tree model may be developed for POS customers associated with a test sample, and customers may be segmented based on POS usage. Model validation may be performed on a validation sample segment and segment development and rules generation may be performed during this phase 910.

A customer profiling phase 920 may determine a customer attributes profile for POS customers and calculate a POS ticket size for each profile that is determined. This phase 920 may also perform an iterative process for each segment that is developed and determine a POS ticket size for each mini-segment generate using look-alike modeling. A look-alike model phase 930 may then implement the model rules for ATM-only customers, develop segments, and implement POS ticket sizes as appropriate. Finally, during a spend potential phase 940, monetary amounts may be distributed among segments in accordance with predicted POS spending. In this way, the framework 900 may continually monitor and adjust value propositions as appropriate to remain relevant and competitive. Moreover, customer segments may be generated and targeted differently for marketing campaigns, and segment spend potentials may be used to micro-manage marketing performance.

Note that a single payment account may be used by more than one person. For example, multiple members of a family or business may use a payment account. Further note that embodiments described herein may generate predicted ATM-to-POS migration information for an account owner, an account owner's household, and/or an account owner's business.

Figure 10:
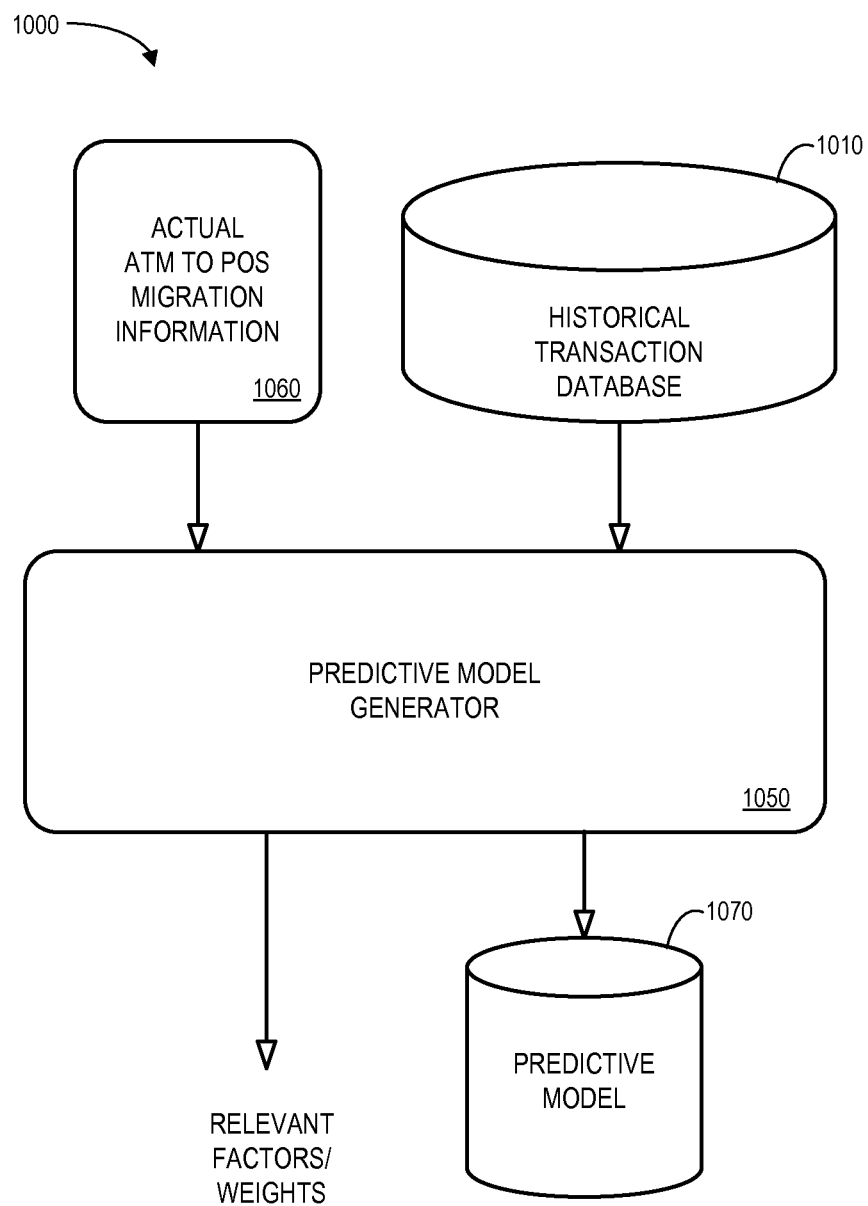
FIG. 10 is a block diagram of a system including a predictive model generator according to some embodiments.

Note that the rules and logic described with respect to FIGS. 7 and 9 might be manually designed and constructed by a human operator. In some cases, however, relevant factors in an account owner database may be automatically identified and/or used to create a predictive model. For example, FIG. 10 is a block diagram of a system 1000 including a predictive model generator 1050 according to some embodiments. The predictive model generator 1050 may receive actual ATM-to-POS migration information 1060 along with historical transaction database 1010 information (including, in some embodiments, demographic information). For example, historical credit card purchases may be received along with indications of the transition from ATM usage to POS transactions of actual account holders in the past.

The predictive model generator 1050 may look for patterns in the historical transaction information to identify relevant factors and/or associated weights. For example, account owners who have transactions with at least two POS transaction per week might be identified as being likely to further migrate from ATM usage to POS transactions.

Figure 11:
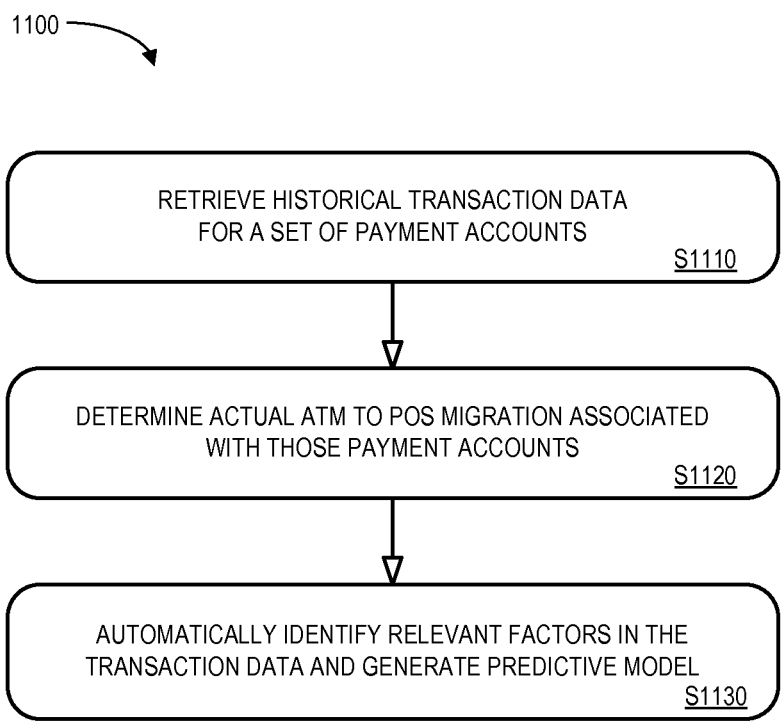
FIG. 11 is a flow chart illustrating how a predictive model might be generated according to some embodiments.

FIG. 11 is a flow chart illustrating how a predictive model might be generated according to some embodiments. At S1110, historical transaction data is retrieved from a set of payment accounts. Actual ATM-to-POS migration information associated with those payment accounts is determined at S1120. The relevant factors in the historical transaction data may be automatically identified at S1130 and a predictive model may be automatically generated.

Thus, according to some embodiments, predicted ATM-to-POS migration behavior may be based at least in part on rules created by a predictive model trained with historical transaction and/or demographic information. According to some embodiments, a predictive model utilizes different groupings associated with different sets and/or weights of relevant factors. For example, depending on high level grouping, different variables may be significant and/or relevant and the weightings of common variables may be different.

In general, and for the purposes of introducing concepts of embodiments of the present invention, a computer system may incorporate a "predictive model." As used herein, the phrase "predictive model" might refer to, for example, any of a class of algorithms that are used to understand relative factors contributing to an outcome, estimate unknown outcomes, discover trends, and/or make other estimations based on a data set of factors collected across prior trials. Note that a predictive model might refer to, but is not limited to, methods such as ordinary least squares regression, logistic regression, decision trees, neural networks, generalized linear models, and/or Bayesian models. The predictive model is trained with historical transaction information, and may be applied to current or test transactions to determine likely ATM-to-POS migration behaviors.

The predictive model generator 1050 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein. The predictive model generator 1050, in various implementation, may include one or more of neural networks, Bayesian networks (such as Hidden Markov models), expert systems, decision trees, collections of decision trees, support vector machines, or other systems known in the art for addressing problems with large numbers of variables. According to some embodiments, the predictive model(s) are trained on prior data and demographic information known to the credit card company. The specific data and outcomes analyzed may vary depending on the desired functionality of the particular predictive model. The particular data parameters selected for analysis in the training process may be determined by using regression analysis and/or other statistical techniques known in the art for identifying relevant variables in multivariable systems.

Thus, embodiments may help issuer banks engage customers to use their debit or credit cards at POS devices. Embodiments described herein may provide a business framework for identifying those "ATM only" (or "primarily ATM") customers who can be migrated to POS with relative ease (as well as, in some embodiments, calculating spend potentials at POS devices). To understand which customers are likely to move to POS transactions, some embodiment may utilize a combination of Chi Square Automatic Interaction Detection ("CHAID") methodology and a logistic model. Moreover, embodiments may be built based on different banks' portfolios and customer demographics and transactional information. The rules may be developed based on, for example, the different attributes that contribute for POS behavior.

The rules developed may be implemented to "ATM only" account owners to identify which customers have a high likelihood for migrating to POS behaviors. The implementation of rules may also provide the spend potential of each customer (or of a customer segment).

According to some embodiments, different buckets of customers may be provided such that each bucket may be targeted differently in order to obtain a high Return On Investment ("ROI"). The issuers may further calculate a net revenue based on expenditures as appropriate.

Moreover, some embodiments may utilize methodology based on statistical model development and implementation (and, as a result, may perform in a robust fashion) and generate segments that are highly inclined towards POS usage if rewards or offer are provided to account owners. Similarly, embodiments might identify the customer segments that are least inclined for POS usage. In this way, campaign budgets may be strategized to target the best customers.

Because of the robustness of the methodology, embodiments may be implemented for different issuers on a worldwide basis, and may also be used for post-campaign implementation management.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system, comprising:
   an account owner database storing account owner information associated with account owners of payment accounts;
   a set of Automated Teller Machine ("ATM") users database;
   a sub-set for Point Of Sale ("POS") migration database;
   an analyzer platform coupled to the account owner database, the set of ATM users database, and the sub-set for POS migration database, including:
      a computer processor for executing program instructions; and
      a memory, coupled to the computer processor, for storing program instructions for execution by the computer processor for:
         analyzing the account owner information to automatically identify a set of account owners primarily associated with ATM device transactions in connection with the payment accounts,
         storing information about the identified set of account holders into the set of ATM users database;
         from the set of ATM users database, automatically creating a sub-set of account owners likely to be successfully encouraged to utilize POS transactions, instead of ATM device transactions, in connection with the payment accounts,
         storing information about the created sub-set of account holders into the sub-set for POS migration database;
         calculating a potential transaction spend value associated with each entry in the sub-set for POS migration database, and
         transmitting indications of the potential transaction spend values; and
   an output device to receive the indications of the potential transaction spend values and display to a user indications of user account identifiers, each proximate to a display of an associated potential transaction spend value.

2. The system of claim 1, wherein the payment accounts are associated with at least one of: (i) credit card accounts, (ii) debit card accounts, (iii) bank accounts, and (iv) pre-paid card accounts.

3. The system of claim 1, wherein the account owner information is associated with demographic information.

4. The system of claim 3, wherein the demographic information includes at least one of: (i) ages, (ii) genders, (iii) location information, (iv) income information, (v) education information, (vi) marital status, and (vii) occupation.

5. The system of claim 1, wherein the account owner information is associated with transaction information representing payments made via the payment accounts.

6. The system of claim 5, wherein the transaction information comprises at least one of: (i) account identifiers, (ii) merchant identifiers, (iii) dates, (iv) times of day, (v) payment amounts, (vi) payment descriptions, (vii) location information, and (viii) transaction frequencies.

7. The system of claim 1, further comprising:
   automatically identifying relevant factors in the account owner database.

8. The system of claim 1, further comprising:
   generating a confidence level associated with the automatically calculated potential transaction spend value.

9. The system of claim 1, wherein the set of account owners primarily associated with ATM device transactions is identified on a portfolio-by-portfolio basis.

10. The system of claim 1, wherein the sub-set of account owners to be encouraged to utilize POS transactions is created based at least in part on account owner profiling and a statistical model.

11. A computer-implemented method, comprising:
retrieving, from an account owner database by a computer processor of an analyzer platform, account owner information associated with account owners of payment accounts;
analyzing, by the computer processor, the retrieved account owner information to automatically identify a set of account owners primarily associated with Automated Teller Machine ("ATM") device transactions in connection with the payment accounts;
storing information about the identified set of account holders into a set of ATM users database;
from the set of ATM users database, automatically creating, by the computer processor, a sub-set of account owners likely to be successfully encouraged to utilize Point Of Sale ("POS") transactions, instead of ATM device transactions, in connection with the payment accounts;
storing information about the created sub-set of account holders into a sub-set for POS migration database;
automatically calculating, by the computer processor, a potential transaction spend value for each entry in the sub-set for POS migration database;
transmitting indications of the potential transaction spend values; and
receiving, by an output device, the indications of the potential transaction spend values and displaying to a user indications of user account identifiers, each proximate to a display of an associated potential transaction spend value.

12. The method of claim 11, wherein the payment accounts are associated with at least one of: (i) credit card accounts, (ii) debit card accounts, (iii) bank accounts, and (iv) pre-paid card accounts.

13. The method of claim 11, wherein the account owner information is associated with demographic information.

14. The method of claim 13, wherein the demographic information includes at least one of: (i) ages, (ii) genders, (iii) location information, (iv) income information, (v) education information, (vi) marital status, and (vii) occupation.

15. The method of claim 11, wherein the account owner information is associated with transaction information representing payments made via the payment accounts.

16. The method of claim 15, wherein the transaction information comprises at least one of: (i) account identifiers, (ii) merchant identifiers, (iii) dates, (iv) times of day, (v) payment amounts, (vi) payment descriptions, (vii) location information, and (viii) transaction frequencies.

17. A non-transitory, computer-readable medium having stored therein instructions that, upon execution, cause a computer processor to perform a method, the method comprising:
retrieving, from an account owner database by a computer processor of an analyzer platform, account owner information associated with account owners of payment accounts;
analyzing, by the computer processor, the retrieved account owner information to automatically identify a set of account owners primarily associated with Automated Teller Machine ("ATM") device transactions in connection with the payment accounts;
storing information about the identified set of account holders into a set of ATM users database;
from the set of ATM users database, automatically creating, by the computer processor, a sub-set of account owners likely to be successfully encouraged to utilize Point Of Sale ("POS") transactions, instead of ATM device transactions, in connection with the payment accounts;
storing information about the created sub-set of account holders into a sub-set for POS migration database;
automatically calculating, by the computer processor, a potential transaction spend value for each entry in the POS migration database;
transmitting indications of the potential transaction spend values; and
receiving, by an output device, the indications of the potential transaction spend values and displaying to a user indications of user account identifiers, each proximate to a display of an associated potential transaction spend value.

18. The medium of claim 17, wherein the payment accounts are associated with at least one of: (i) credit card accounts, (ii) debit card accounts, (iii) bank accounts, and (iv) pre-paid card accounts.

19. The medium of claim 17, wherein the account owner information is associated with demographic information.

20. The medium of claim 19, wherein the demographic information includes at least one of: (i) ages, (ii) genders, (iii) location information, (iv) income information, (v) education information, (vi) marital status, and (vii) occupation.

21. The medium of claim 19, wherein the account owner information is associated with transaction information representing payments made via the payment accounts.

22. The medium of claim 21, wherein the transaction information comprises at least one of: (i) account identifiers, (ii) merchant identifiers, (iii) dates, (iv) times of day, (v) payment amounts, (vi) payment descriptions, (vii) location information, and (viii) transaction frequencies.

* * * * *